US010911964B2

(12) United States Patent
Reese et al.

(10) Patent No.: US 10,911,964 B2
(45) Date of Patent: Feb. 2, 2021

(54) METHODS AND APPARATUS FOR PROVIDING NETWORK CONNECTIVITY DATA FOR A COMPUTING DEVICE ONBOARD A VEHICLE

(71) Applicant: Honeywell International Inc., Morris Plains, NJ (US)

(72) Inventors: David Reese, Glendale, AZ (US); Alejandro Perez Avila, Tempe, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 15/489,518

(22) Filed: Apr. 17, 2017

(65) Prior Publication Data

US 2017/0325111 A1 Nov. 9, 2017

Related U.S. Application Data

(60) Provisional application No. 62/333,353, filed on May 9, 2016.

(51) Int. Cl.
*H04W 24/08* (2009.01)
*H04L 12/26* (2006.01)
(Continued)

(52) U.S. Cl.
CPC ........ *H04W 24/08* (2013.01); *H04B 7/18513* (2013.01); *H04L 41/22* (2013.01);
(Continued)

(58) Field of Classification Search
CPC .... H04W 24/08; H04B 7/18513; H04L 41/22; H04L 43/045; H04L 43/0811; H04L 43/50; H04L 67/12
See application file for complete search history.

(56) References Cited

U.S. PATENT DOCUMENTS 5,521,958 A 5/1996 Selig et al.
6,453,259 B1 9/2002 Infiesto
(Continued)

FOREIGN PATENT DOCUMENTS

| CN | 204948363 | 1/2016 |
| EP | 1441451 | 7/2004 |
| WO | 2015/184332 A1 | 12/2015 |

OTHER PUBLICATIONS

Honeywell Aerospace, "Honeywell Connects With New Godirect Satcom Network App", "https://aerospace.honeywell.com/en/news-listing/2016/august/honeywell-connects-with-new-godirect-satcom-network-app", Aug. 2016, pp. 1-2.
(Continued)

*Primary Examiner* — Christopher M Crutchfield
*Assistant Examiner* — Tito Q Pham
(74) *Attorney, Agent, or Firm* — Bookoff McAndrews, PLLC

(57) ABSTRACT

A method for presenting network connectivity data is provided. The method comprises: testing a plurality of communications components and communications links of a network, wherein each of the plurality of components and communications links is communicatively coupled to a computing device, where the plurality of communications components and communications links is configured to provide the computing device access to a ground network; determining operational capability of each of the plurality of components and communications links; and presenting an indication of the operational capability for each of the plurality of components and communications links based upon results of the testing.

17 Claims, 10 Drawing Sheets

(51) Int. Cl.
   *H04L 12/24* (2006.01)
   *H04B 7/185* (2006.01)
   *H04L 29/08* (2006.01)

(52) U.S. Cl.
   CPC ........ *H04L 43/045* (2013.01); *H04L 43/0811* (2013.01); *H04L 43/50* (2013.01); *H04L 67/12* (2013.01)

(56) References Cited

U.S. PATENT DOCUMENTS

| | | | |
|---|---|---|---|
| 7,124,369 B2* | 10/2006 | Beaudoin | H04L 41/22 715/738 |
| 7,342,513 B2 | 3/2008 | Meyer | |
| 8,024,618 B1 | 9/2011 | Margolis | |
| 8,353,006 B2 | 1/2013 | Lynch et al. | |
| 8,782,738 B2 | 7/2014 | Lynch et al. | |
| 2003/0203734 A1* | 10/2003 | Igloi | H04L 69/329 455/431 |
| 2004/0147259 A1* | 7/2004 | Taylor | H04B 7/18508 455/430 |
| 2005/0202785 A1 | 9/2005 | Meyer | |
| 2009/0196207 A1* | 8/2009 | Watanabe | H04L 41/22 370/310 |
| 2009/0282469 A1 | 11/2009 | Lynch et al. | |
| 2014/0130111 A1* | 5/2014 | Nulty | H04N 17/004 725/107 |
| 2014/0179238 A1* | 6/2014 | Wynn | H04L 41/5067 455/67.11 |
| 2015/0304171 A1* | 10/2015 | Kim | H04L 67/125 715/733 |
| 2016/0123600 A1* | 5/2016 | Phillips | H04B 10/116 99/337 |
| 2017/0031997 A1* | 2/2017 | Merg | G06F 17/30528 |

OTHER PUBLICATIONS

Honeywell Aerospace, "Godirect Satcom Network", "https://aerospace.honeywell.com/en/news-listing/2016/august/honeywell-connects-with-new-godirect-satcom-network-app", 2017, pp. 1-4.

Itunes App Store, "Godirect Satcom Network on the App Store", "https://itunes.apple.com/us/app/godirect-satcom-network/id1036937651?mt=8", Dec. 17, 2016, pp. 1-2, Publisher: iTunes.

European Patent Office, "Extended European Search Report from EP Application No. 17169154.6, dated Sep. 29, 2017", "from Foreign Counterpart of U.S. Appl. No. 15/489,518", dated Sep. 29, 2017, pp. 1-8, Published in: EP.

Communication pursuant to Article 94(3) EPC dated May 14, 2018 in European Application No. 17169154.6.

* cited by examiner

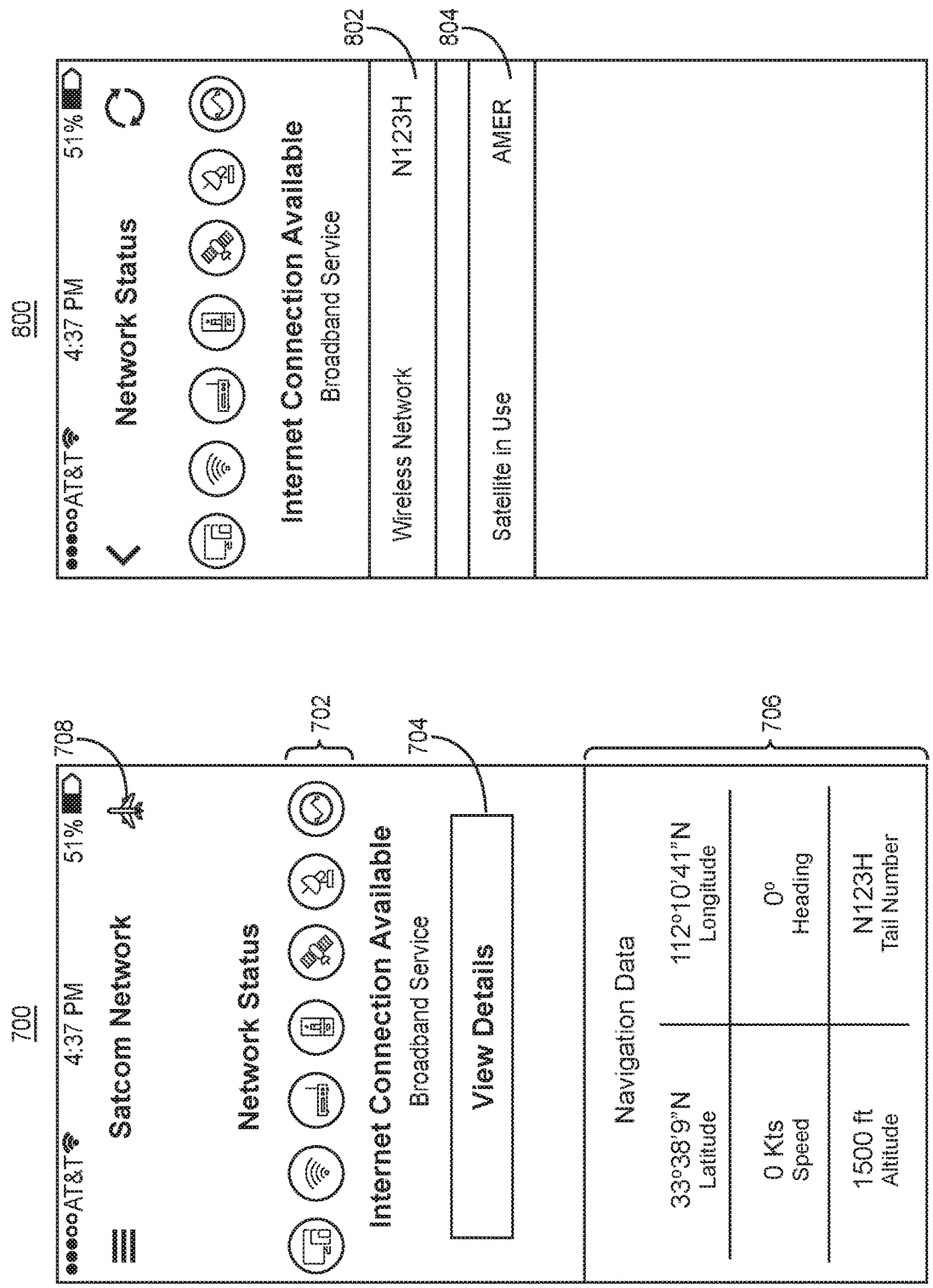

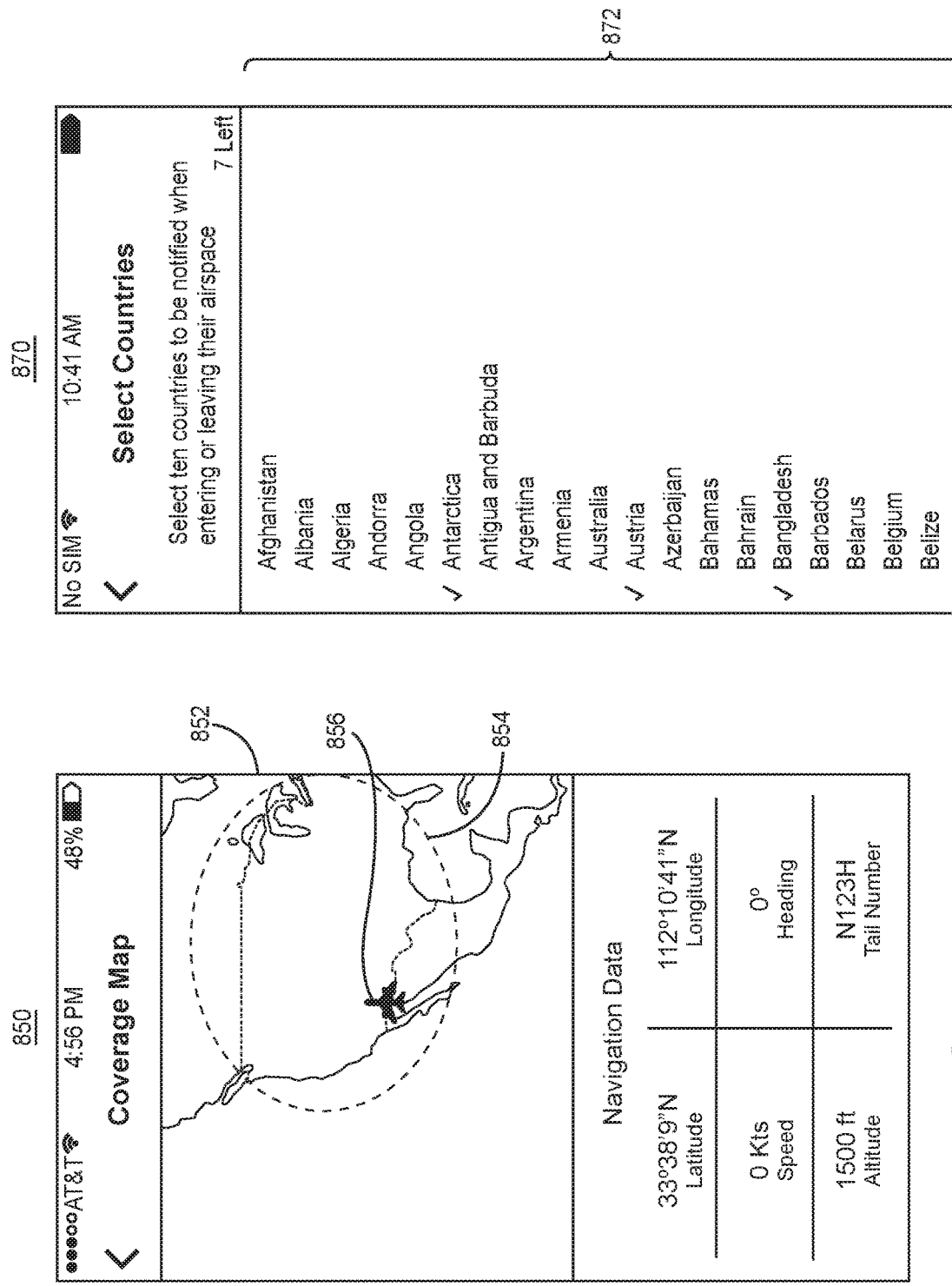

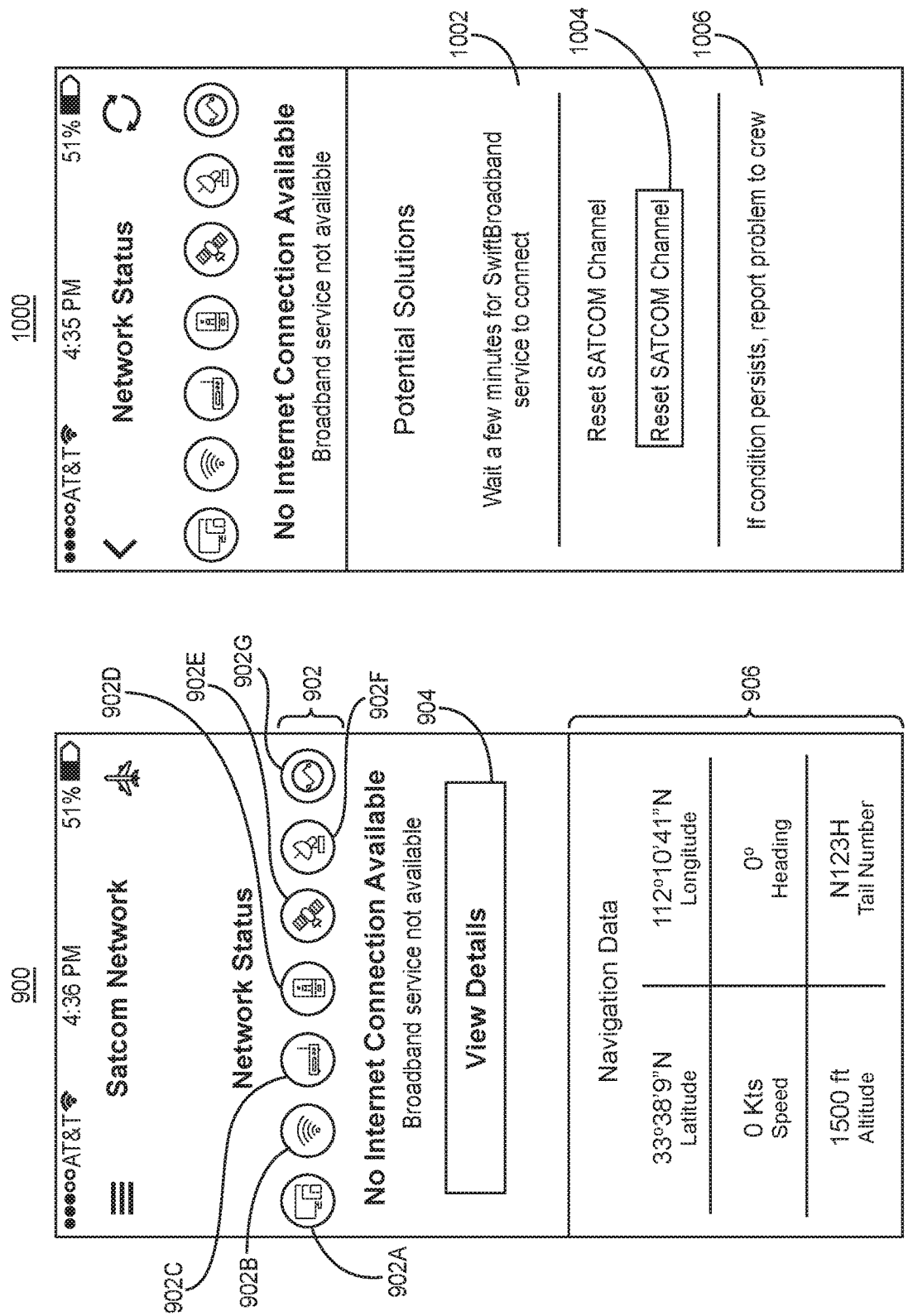

METHODS AND APPARATUS FOR PROVIDING NETWORK CONNECTIVITY DATA FOR A COMPUTING DEVICE ONBOARD A VEHICLE

CROSS-REFERENCED TO RELATED APPLICATIONS

This application claims the benefit of provisional U.S. Patent Application Ser. No. 62/333,353 filed May 9, 2016, which is incorporated herein by reference in its entirety.

BACKGROUND

Communications systems on aircraft provide passenger connectivity to data networks (e.g., the Internet) that is increasingly relied upon during travel. For example, aviation satellite and ground communications systems provide passenger connectivity to international voice and data networks used inflight. Typically, the only indication of a connectivity problem is when passengers cannot access the Internet, make phone calls, or otherwise perform operations consistent with network connectivity. The lack of information diminishes passenger satisfaction, and makes rectifying the problem challenging. Accordingly, there is a need to more promptly obtain data about network connectivity onboard the aircraft, and root causes for any problems therewith.

SUMMARY

A method for presenting network connectivity data is provided. The method comprises: testing a plurality of communications components and communications links of a network, wherein each of the plurality of components and communications links is communicatively coupled to a computing device, where the plurality of communications components and communications links is configured to provide the computing device access to a ground network; determining operational capability of each of the plurality of components and communications links; and presenting an indication of the operational capability for each of the plurality of components and communications links based upon results of the testing.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 7 illustrates one embodiment of a network status graphical user interface showing whether a computing device is connected to a network, and an Internet connection is available;

FIG. 8A illustrates one embodiment of a graphical user interface of a details page;

FIG. 8B illustrates one embodiment of a graphical user interface of a coverage map;

FIG. 8C illustrates one embodiment of a graphical user interface of a list of countries;

FIG. 9 illustrates one embodiment of graphical user interface of a network status page;

FIG. 10 illustrates another embodiment of a graphical user interface of a details page;

DETAILED DESCRIPTION

Figure 1:
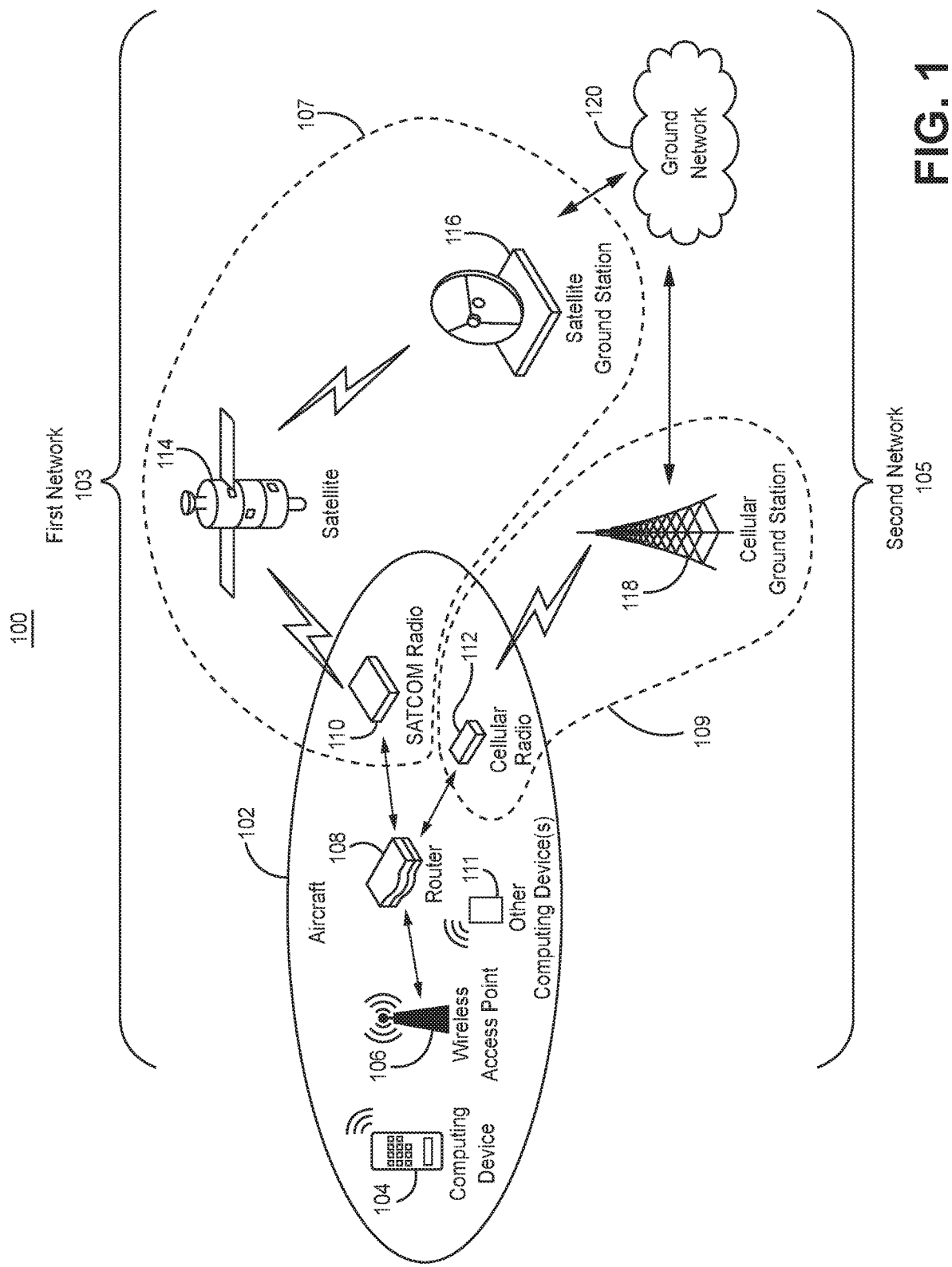
FIG. 1 illustrates one embodiment of a diagram of a system for providing network connectivity data.

The following detailed description is merely illustrative in nature and is not intended to limit the embodiments of the subject matter herein and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In one embodiment, methods and apparatus are described for providing data about network connectivity (network connectivity data) to a computing device for a user onboard a vehicle. In another embodiment, the network connectivity data indicates an operational status of each of a plurality of communications components and communications links that are used to provide network connectivity to the computing device. Communications links include the links, e.g. between a SATCOM radio and a satellite, between a cellular radio and a cellular ground station, between a satellite and a satellite ground station, between a satellite, satellite ground station, or cellular ground station and a ground network. In a further embodiment, the network connectivity data includes data associated with a location of the computing device during vehicle travel, network status, devices connected to a vehicle network, and a coverage map for an external network to which the vehicle network is connected.

In one embodiment, status of network connectivity, and suggested actions to resolve connectivity problems are provided by an application (app), e.g. a software application, executed by a computing device. In another embodiment, this is accomplished by performing one or more of the functions listed below, e.g. within the application. Other functions may be provided, as will be subsequently described.

The application identifies the communications components and communications links of a communications network, and the type of communications services available, on and to the vehicle, and associates to the vehicle registration information or identifier, e.g. aircraft tail number. In one embodiment, the application, e.g. in a database stores such information. Alternatively, the application obtains such information remotely, e.g. from a server or a cloud system.

Sequentially query each communications component of a communications network to ascertain operational status using methods specific to a communications component. Communications components may have a disparate set of standard networking protocols, and thus several different networking tools could otherwise be required. Off-vehicle communications links are evaluated using methods specific to those links.

Consolidate, interpret and analyze information from each communications component and communications link into a concise visual representation and textual description of end-to-end connectivity status, which would otherwise require manual data gathering, manipulation and interpretation from a disparate set of networking tools.

Identify the in-use communications, e.g. satellite, service and use vehicle navigation data to locate and display on a map vehicle location within a communications service coverage area, which would otherwise require manual consolidation of information from disparate data sources.

Periodically or continuously, evaluate the end-to-end network connectivity status, including the number of network users, and provide notification of network connectivity issues, including an excessive number of users, which would have otherwise required manual repetition of data gathering, manipulation and interpretation.

Periodically or continuously monitor vehicle location and provides notifications associated with vehicle movement and/or vehicle location that may affect network connectivity status, such as moving into or out of a service coverage area, or moving into or out of a selected set of countries, which would otherwise require manual repetition of data consolidation and interpretation.

Identify a communications component or link in which a network connectivity issue has occurred and provide recommendations that may be taken to resolve the issue, which would otherwise be left to the flight crew to research corrective actions.

Provide recovery mechanisms specific for a component or link that may be executed to resolve an identified issue, which would otherwise not be easily available or known by the flight crew.

Record the end-to-end connectivity status checks, service type, notifications, executed recovery mechanisms and aircraft position in a log file with date and time stamping, which may be viewed or emailed to facilitate troubleshooting and post-flight analysis, which would otherwise require manual data consolidation into a single file.

Monitor for any detected anomalies in communications components and links; and display suggested remedies that may be taken by vehicle crew to redress the anomalies.

Use iconographic representations of the communications components and links with animation, coloration and/or textual messages to indicate component and link status and end-to-end connectivity status. The application will embody mechanisms to correct connectivity issues that may arise in the components and links, such as rebooting or restarting a component.

FIG. 1 illustrates one embodiment of a diagram of a system 100 for providing network connectivity data. For pedagogical purposes, a vehicle may be described hereinafter as an aircraft. However, it is understood that the teachings herein are applicable to other types of vehicles including without limitation automobiles (cars, buses, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and any other type of vehicle.

In one embodiment, the aircraft 102 includes a communications system including a plurality of components communicatively coupled to each other, in sequence, to provide network connectivity to a computing device 104. The computing device 104 may be without limitation a laptop computer, a tablet, a smartphone, a smart-watch, a personal digital assistant (PDA), or any other type of computing device that can be coupled to a wired or wireless network.

In one embodiment, the wired network is an Ethernet network. In another embodiment, the wireless network is an IEEE802.11, or "Wi-Fi", compliant network.

In one embodiment, the plurality of components includes a wireless access point 106, a router 108, and a SATCOM radio 110 and/or a cellular radio 112. The router 108 is coupled with the wireless access point 106. In another embodiment, the wireless access point 106 and router 108 may be integrated together. In a further embodiment, the wireless access point 106 is an IEEE802.11 compliant access point.

In one embodiment, a ground network 120, e.g. the Internet, and the computing device 104 exchange data and/or voice communications respectively over a data network and/or voice network. In another embodiment, the data network and/or voice network is coupled to the computing device 104 through either a cellular data and/or satellite data network.

In one embodiment, a first network 103, e.g. a data network, comprises the wireless access point 106, a router 108, the SATCOM radio 110, the satellite 114, the satellite ground station 116, and the ground network 120. The wireless access point 106 is coupled to the router 108. The router 108 is coupled to the SATCOM radio 110. Each component on the aircraft 102 may be coupled to another component respectively on the aircraft 102 by wired or wireless connection. The SATCOM radio 110 is wirelessly coupled to the satellite 114. The ground station 116 is wirelessly coupled to the satellite 114. The ground network 120 is coupled to the satellite ground station 116 by wireless or wired means. One example of a satellite system including the satellite 114 and the ground station 120 is Intelsat's Epic satellite network. In another embodiment, a satellite communications network 107 comprises the SATCOM radio 110, the satellite 114, and the satellite ground station 116. In a further embodiment, a cellular communications network 109 comprising the cellular radio 112 and the cellular ground station 118.

For pedagogical purposes, the term satellite 114 shall be used hereinafter. However, where the term "satellite" 114 is used, the term "satellite constellation" may be used in its place. Satellite constellation means two or more satellites.

In one embodiment, a second network 105, e.g. a data network, comprises the wireless access point 106, a router 108, the cellular radio 112, a cellular ground station 118, e.g.

an eNodeB, and the ground network 120. The wireless access point 106 and router 108 are coupled as described above. The router 108 is coupled to the cellular radio 112 by wireless or wired means. The cellular radio 112 is wirelessly coupled, e.g. using a Long-Term Evolution (LTE) air interface, to the cellular ground station 118. The ground network 120 is coupled to the cellular ground station 118 by wireless or wired means.

For pedagogical purposes, the communications network providing connectivity to the ground network will be described in terms of the satellite communications network 107. However, other communications networks, such as the cellular network 109, may also be utilized in lieu of the satellite communications network 109.

In one embodiment, the computing device 104 is coupled by wireless and wired means to the first network 103 and/or second network 105 via the wireless access point 106 and the router 108. Once coupled to either network, the computing device 104 can send and receive data, e.g. from the Internet. In another embodiment, at least one other computing device 111, e.g. used by passengers on the aircraft 102, are coupled to the first network 103 and/or second network 105 via the wireless access point 106 and the router 108, and can send and receive data, e.g. form the Internet.

Figure 2:
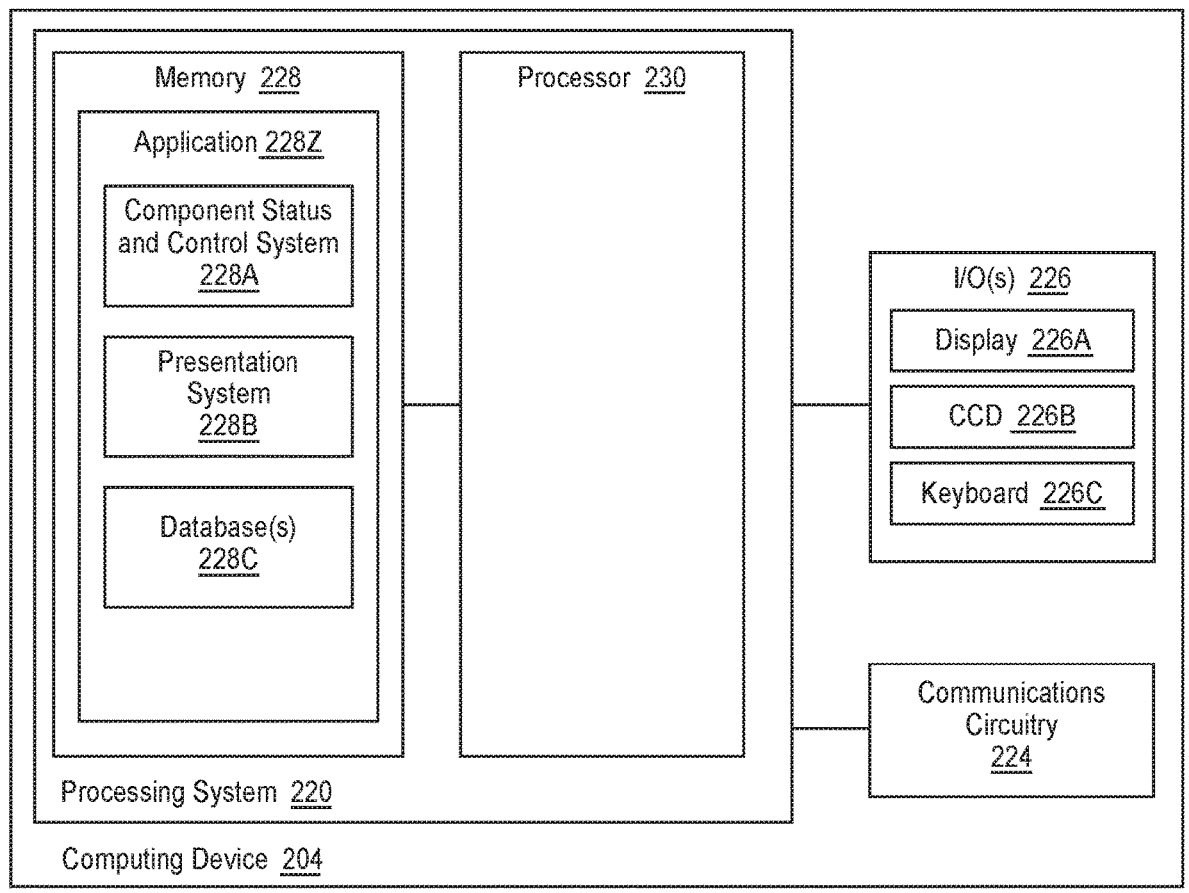
FIG. 2 illustrates one embodiment of a functional block diagram of a computing device.

FIG. 2 illustrates one embodiment of a functional block diagram of a computing device 204. The computing device 204 includes a processing system 220 coupled to communications circuitry 224 and at least one input/output device (I/Os) 226.

The at least one input/output device 226 allows a user to interact with the computing device 204. For example, at least one input/output device 226 can be manipulated by an operator to view, manipulate, annotate, flag, or otherwise interact with an application 228Z, e.g. at least one of a component status and control system 228A, a presentation system 228B, and at least one database 228C.

In one embodiment, the at least one input/output device 226 also includes at least one of: (a) a cursor control device (CCD) 226B, such as a mouse and/or a joystick, and (b) a keyboard. In a further embodiment, the at least one input/output device 226 includes a keypad, buttons, switches, knobs, a touchpad, a microphone, and/or any other device that enables the user to select options, input information, or otherwise control the operation of the computing device 204.

The at least one input/output device 226 allows a user to interact with the computing device 204. In one embodiment, the at least one input/output device 226 can be manipulated by an operator to view, manipulate, annotate, flag, or otherwise interact with at least one of a component status and control system 228A, a presentation system 228B, and at least one database 228C stored in the memory 228 of the processing system 220.

In one embodiment, the processing system 220 renders a graphical user interface (GUI), e.g. of the presentation system 228B of the application 228Z, on the display 226A that facilitates a user's interaction with various features of systems and/or databases of the computing device 204. In another embodiment, data, messages, symbols and maps are rendered on the GUI with the presentation system 228B. In a further embodiment, the processing system 220 renders one or more graphical representations or images, e.g. associated with network connectivity data on the display device 226A as described further below. In yet another embodiment, the display device 226A is a touch-sensitive display that allows the user to tactilely interacting with the GUI.

In one embodiment, the processing system 220 includes the memory 228 coupled to a processor 230. In another embodiment, the processor 230 reads information from, and writes information to, the memory 228. In a further embodiment, the memory 228 and the processor 230 can be implemented in whole or in part by one or more general purpose processors, microprocessors, graphics processor units, controllers, microcontrollers, state machines, content addressable memories, a digital signal processors, an application specific integrated circuits, field programmable gate arrays, programmable logic devices, discrete gates, transistor logic, RAM memories, flash memories, EPROM memories, EEPROM memories, hard disk drives and/or discrete hardware components.

In one embodiment, the memory 228 comprises the application 228Z. In another embodiment, the application 228Z includes the component status and control system 228A, the presentation system 228B, and the at least one database 228C. The memory 228 may comprise two or more separate memory elements; the component status and control system 228A, presentation system 228B, and the at least one database 228C may be stored in separate memory elements. Database as used herein includes databases in the conventional sense and any other means of storing data such as data files, data registers, etc. The application 228Z, e.g. the component status and control system 228A, presentation system 228B, and the at least one database 228C, are executed or processed by the processor 230.

In one embodiment, the component status and control system 228A is configured to evaluate the operational status, of each component and communications link of selected network(s), e.g. the first network 103 and/or the second network 105. Operational status includes whether the components and communications links are operational, and possibly their characteristics such as identifier, IP address, mode, data rate, channel, etc., e.g. as further illustrated below. In another embodiment, the component status and control system 228A is configured to control one or more communications components and/or communications links of selected network(s), e.g. to reset communications components, initiate ping tests, to change channels, etc. The selected network(s) are the network(s) chosen to permit a computing device 104 to be coupled to the ground network 120.

In one embodiment, the component status and control system 228A obtains an operating status for each component of the selected network(s), based on the testing. In another embodiment, the component status and control system 228A initiates tests of one or more components of the selected network(s) to the extent required to determine operating status of such components. In a further embodiment, upon completing the evaluation, the presentation system 228B presents the operating status of each component through the at least one input/output device 226, e.g. the display 226A.

In one embodiment, if there is a problem with a network communications component, the component status and control system 228A facilitates remote resetting of the communications component. In another embodiment, the component status and control system 228A also facilitates controlling other aspects of a communications component, e.g. changing the channel of the SATCOM radio 110.

In one embodiment, data used by the component status and control system 228A to perform the evaluation and the results of such evaluation are stored in the at least one database 228C. In another embodiment, the at least one database 228C may be included in the component status and control system 228A and/or the presentation system 228B.

In a further embodiment, the at least one database 228C may include the networks accessible by one or more vehicles, the communications components to be evaluated by the one or more vehicles, and the tests and test data used to evaluate each communications component. In yet another embodiment, the data generated by the communications component status system 228A is also stored in the at least one database 228C. In yet a further embodiment, data stored by the at least one database 228C includes without limitation communications component status data, status logs, wireless network identification data, satellite communications network identification data, communications protocol for various communications components, vehicle identification data (e.g., aircraft tail number data), and settings for the component status and control system 228A and presentation system 228B.

In one embodiment, the presentation system 228B is configured to have display 226A display various icons, text, and/or graphical elements associated with an operational status of various communications components and communications links associated with network connectivity of the computing device 104. In another embodiment, the display 226A is configured to display data about:

- location of the computing device 104 (onboard an aircraft 102 which is in flight or travelling) or location of the aircraft 102;
- settings of the computing device 104;
- a wireless network status;
- at least one other computing device 111 connected to a wireless network;
- network connectivity coverage map; and
- status logs presenting data associated with various communications components.

In one embodiment, the communications circuitry 224 is Ethernet communications circuitry and/or IEEE802.11 compliant communications circuitry. In another embodiment, the communications circuitry for wireless connectivity can be or also include Bluetooth compliant communications circuitry and/or cellular communications circuitry. In a further embodiment, the cellular communications device is implemented using 2G, 3G, 4G and/or 5G air interfaces. The communications circuitry 224 facilitates coupling the computing device 204 to the first network 103 and/or the second network 105, and thus to the ground network 120. For pedagogical purposes, communications circuitry 224 and corresponding network connectivity shall only be described with regards to IEEE compliant 802.11 network connectivity. However, communications circuitry and network can apply to other forms of communications, e.g. as described herein.

Figure 3:
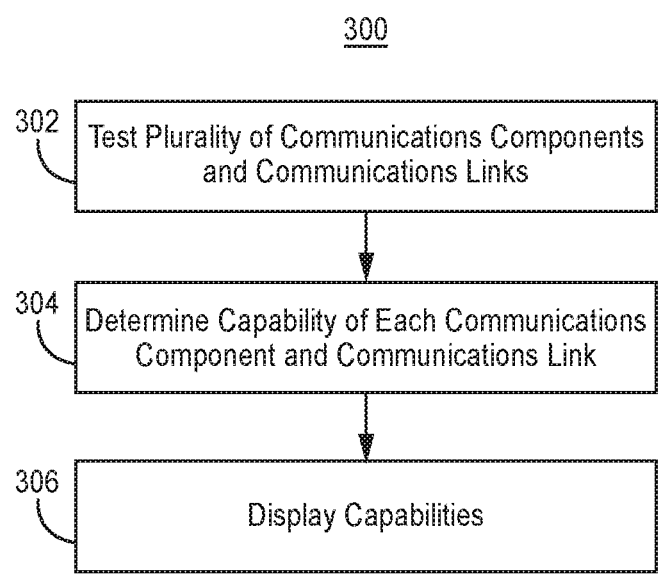
FIG. 3 illustrates one embodiment of a method for providing visual indications of connectivity data onboard an aircraft.

FIG. 3 illustrates one embodiment of a method 300 for providing visual indications of connectivity data onboard an aircraft. To the extent that the embodiment of method 300 shown in FIG. 3 is described herein as being implemented with the system and apparatus shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner). In one embodiment, the method 300 is performed by the application 228Z on the computing device 104.

In block 302, test a plurality of communications components and communications links of a network, e.g. the first and/or second communications network. In block 304, based upon the test results of block 302, determine an operational capability of each of the plurality of communications components and communications links. In one embodiment, determining the operational capability of each of the plurality of communications components and communications links includes identifying whether a particular communications component or link (1) is functioning to provide network connectivity, (2) is not functioning at all, or (3) is not functioning appropriately to provide network connectivity.

In block 306, present, e.g. via graphical elements on the display 226A of the computing device 204, an indication of the operational capability for each of the plurality of communications components based upon the results of the prior testing. In one embodiment, the process 300 displays, e.g. on the display 226A, graphical elements representing one or more operational communications components and communications links using a first set of visual characteristics, and graphical elements representing one or more non-operational communications components and communications links that is not operating (or not operating appropriately to provide network connectivity) using a second set of visual characteristics, wherein the second set of visual characteristics is visually distinguishable from the first set of visual characteristics.

Figure 4:
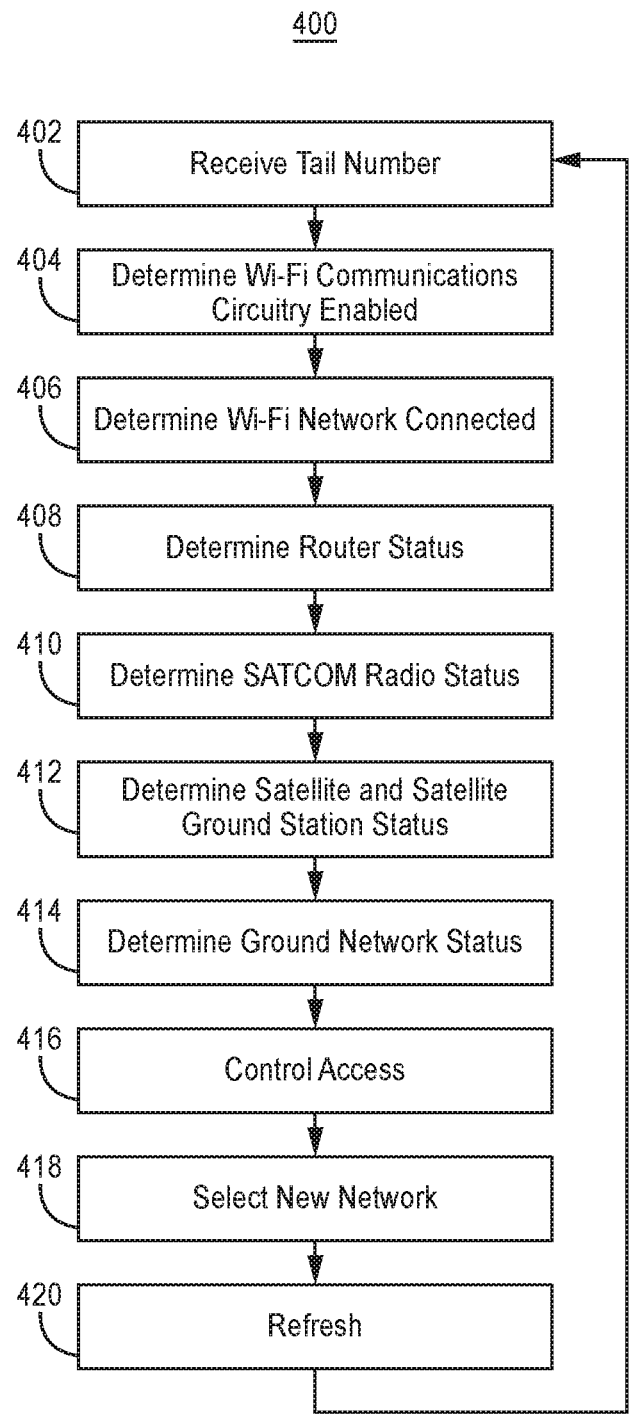
FIG. 4 illustrates one embodiment of a method for determining an operational capability of each of a plurality of communications components and communications links.

FIG. 4 illustrates one embodiment of a method 400 for determining an operational capability of each of a plurality of communications components and communications links. To the extent that the embodiment of method 400 shown in FIG. 4 is described herein as being implemented with the system and apparatus shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner). In one embodiment, the method 400 is performed by the application 228Z on the computing device 204.

In block 402, a vehicle identifier, such as an aircraft tail number, is received, e.g. by the presentation system 228B. To associate with aircraft registration information, e.g. aircraft tail number, the application 228Z identifies the communications components of networks on the aircraft 102, and the type of communications services offered on the aircraft 102. In another embodiment, once a tail number has been received, it will be the default tail number for the application 228Z unless a new tail number is selected. The vehicle identifier is stored, e.g. in the memory 228 such as for example in the at least one database 228C.

Figure 5:
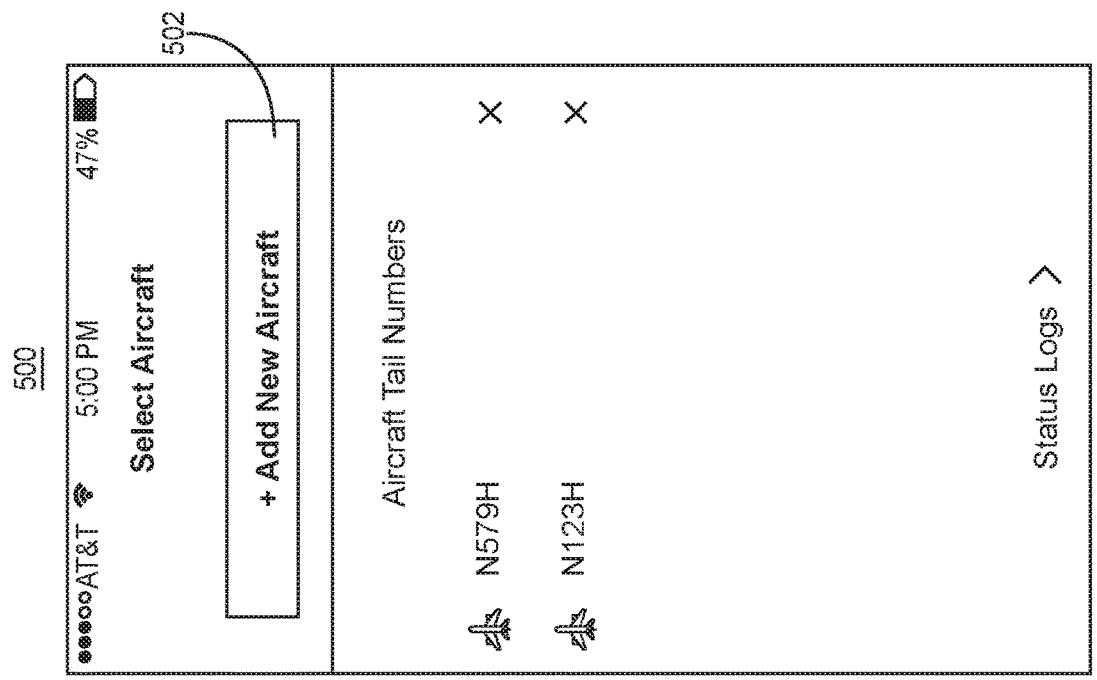
FIG. 5 illustrates one embodiment of a graphical user interface of an application where a tail number for an aircraft is selected.

FIG. 5 illustrates one embodiment of a graphical user interface (GUI) of an application where a tail number for an aircraft is selected, e.g. by a user of the application. FIG. 5 shows two tail numbers corresponding to aircraft that have been entered into the application on the computing device 104. In another embodiment, while on one of the aircraft, upon selecting the tail number, the user can evaluate connectivity data of the corresponding communications system with the computing device 104. The user can select one of the existing tail numbers by clicking on them, or enter a new tail number by clicking on the graphical element 502 labeled "+Add New Aircraft". If the user selects this graphical element 502, then another page is presented allowing the user to enter the tail number of a new aircraft.

Figure 6:
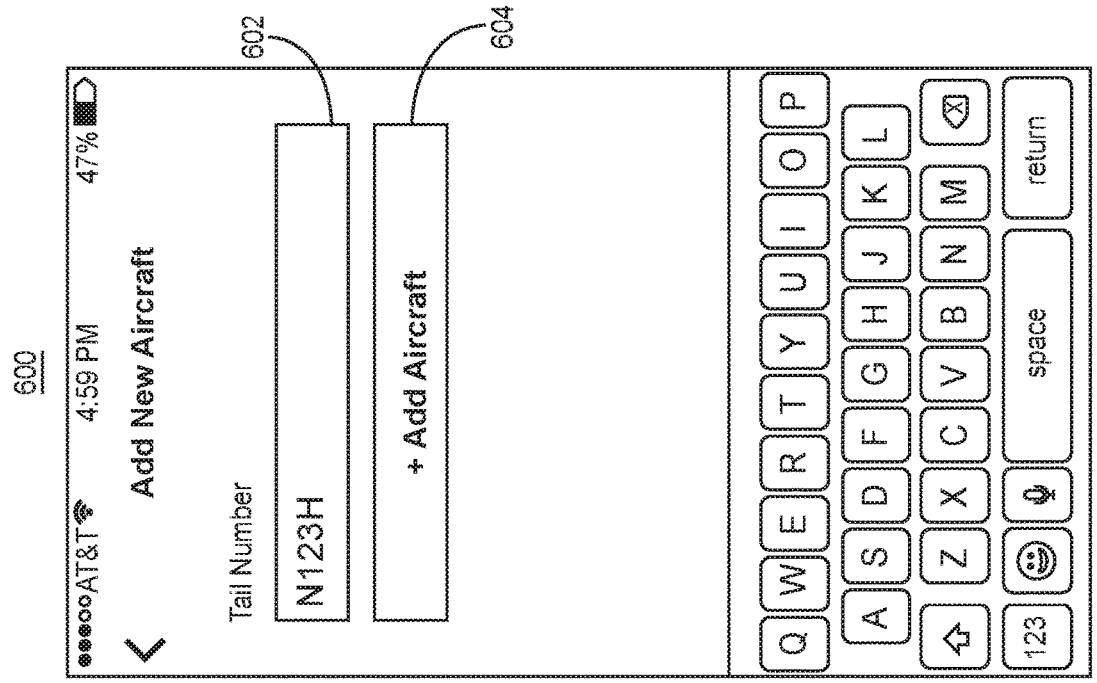
FIG. 6 illustrates one embodiment of a graphical user interface that permits entry of a new tail number for a new aircraft.

FIG. 6 illustrates one embodiment of a graphical user interface that permits entry of a new tail number for a new aircraft, e.g. by a user of the application. The user types in the tail number in the field 602, and enters the tail number by clicking on graphical element 604 labeled "+Add Aircraft". In another embodiment, the application thereafter presents the user with the GUI of FIG. 5, which shows two particular tail numbers of aircraft that have been entered into the application.

In one embodiment, the presentation system 228 displays symbols, in the GUI, for the Wi-Fi status of the computing device 104, the status of the wireless access point 106, the status of the router 108, the status of the SATCOM radio 110, the status of the satellite 114, the status of the ground station 116, and the status of the ground network 120. In another embodiment, by default the colors of the status symbols are grey. In a further embodiment, if a function, device or system is deemed to be functional, then the color is changed to green. In yet another embodiment, if a function, device or system is deemed to be non-functional, then the color is changed to red.

FIG. 7 illustrates one embodiment of a network status GUI 700 showing whether the computing device 104 is connected to a network, and an internet connection is available. In another embodiment, the network status GUI 700 presents icons 702 associated with each communications component and communications link in the sequence of communications components and links that provides network connectivity to the computing device 104 on which the application 228Z resides. In a further embodiment, the network status GUI 700 also presents navigation data 706 associated with the aircraft 102 including latitude, longitude, speed, heading, altitude, and the identifying data for the vehicle (e.g., the tail number of the aircraft). Such navigation data will be subsequently discussed. In yet another embodiment, the network status GUI 700 also includes an aircraft icon 708 which will be subsequently described.

FIG. 8A illustrates one embodiment of a graphical user interface 800 of a details page. In another embodiment, when a user selects the "view details" graphical element 704 of the network status GUI, the application 228Z presents the user with the GUI 800 of the details page shown in FIG. 8A. The GUI 800 of the details page displays the SSID of the wireless network 802 and the identifier of satellite in use 804. Such identifiers will be subsequently described.

Returning to FIG. 4, each communications component and communications link of the network is sequentially queried to evaluate whether it is operational. In block 404, determine, e.g. with the application 228Z, whether IEEE802.11 compliant connectivity is enabled in the computing device 104. In one embodiment, this is determined by interrogating the network settings of the computing device 104. In another embodiment, the status of Wi-Fi connectivity enablement is stored, e.g. in the memory 228. In a further embodiment, if IEEE802.11 compliant connectivity is determined not to be available, then generate, e.g. with the presentation system 228B, a message stating that there is no Wi-Fi connectivity, and illuminate, e.g. in red, on the computing device 104 a symbol corresponding to Wi-Fi connectivity of the computing device 104. In yet another embodiment, generate, e.g. with the presentation system 228B, a message stating: check whether Wi-Fi is enabled. In yet a further embodiment, generate, e.g. with the presentation system 228B, a message stating: no internet connection available.

In one embodiment, if there is connectivity, illuminate (e.g. in green) a symbol corresponding to Wi-Fi connectivity of the computing device 104. In another embodiment, generate, e.g. with the presentation system 228B of the application 228Z, a message stating: Wi-Fi.

In block 406, determine if there is IEEE802.11 compliant wireless network connectivity, e.g. whether the computing device 204 is connected to an IEEE802.11 wireless network. In one embodiment, this is determined by the application 228Z interrogating the network settings of the computing device 104. In another embodiment, the determination of Wi-Fi network connectivity is stored, e.g. in the memory 228.

In one embodiment, if IEEE802.11 compliant wireless network connectivity is determined not to be available, then generate, e.g. with the presentation system 228B, a message indicating that there is no Wi-Fi network connectivity, and illuminate, e.g. in red, a symbol corresponding to the wireless access point 106. In yet another embodiment, if there is no Wi-Fi network connectivity, generate, e.g. with the presentation system 228B, a message stating one or more of: check whether the wireless access point is powered on, whether the computing device has the correct network SSID and password, and to power off and on the wireless access point. In yet another embodiment, generate, e.g. with the presentation system 228B, a message stating no internet connection available.

In one embodiment, if there is connectivity, illuminate (e.g. in green) on the computing device 104 the symbol for the wireless access point 106. In another embodiment, generate, e.g. with the presentation system 228B, a message stating: router.

In block 408, determine the operational status of the router 108. In one embodiment, determining the status of the router 108 entails determining if the computing device 104 has been assigned a valid IP address by the router 108. In another embodiment, determination of a valid IP address entails determining if the assigned IP address is within a proper range of IP addresses (whether an IPv4 or IPv6 address).

In one embodiment, if the operational status of the router 108 has not been verified, then generate, e.g. with the presentation system 228B, a message indicating that there is no connectivity with the router or that it is not responding, and illuminate, e.g. in red, on the computing device 104 a symbol corresponding to the router 108. In another embodiment, if the operational status of the router 108 has not been verified, generate, e.g. with the presentation system 228B, a message stating one or more of: check that router is powered on, power off and on the router, check that you are connected to the router, and if the condition persists report problem to the crew. In yet another embodiment, generate, e.g. with the presentation system 228B, a message stating no Internet connection available.

In one embodiment, if there is connectivity, with the router 108 then illuminate (e.g. in green) the symbol for the router 106. In another embodiment, generate, e.g. with the presentation system 228B, a message stating SATCOM radio or SatCom.

In one embodiment, if the router 108 is determined to be operational, then determine:

(a) an Internet Protocol (IP), or gateway, address of the router 108;

(b) a model and/or part number for the router 108; and/or (c) at least one other computing device 111 connected to the router 108—if any.

In another embodiment, the IP address of the router 108 is determined by interrogating the network settings of the computing device. In a further embodiment, the model and/or part number of the router 108 is obtained using Hypertext Markup Language (HTML) connection to the router 108 and parsing corresponding HTML data of the HTML page generated by the router 108. In yet another embodiment, the model and/or part number of the router 108 is obtained using an Application Programming Interface (API) specific to router 108. In yet another embodiment, the status, IP address, model and/or part number of the router 108 is stored, e.g. in the memory 228.

In one embodiment, the other devices connected to the router 108 are ascertained by performing an Address Resolution Protocol (ARP) scan of gateway (router) IP addresses xxx.xxx.xxx.1-255. Information about uncovered other devices includes their IP address and Media Access Control (MAC) address. In another embodiment, a reverse Domain Name System (DNS) lookup resolution is performed to identify device name. In a further embodiment, the Organizationally Unique Identifier (OUI) portion of the MAC address is compared with an IEEE database to determine the name of the vendor or manufacturer of each of the other devices. In yet another embodiment, the other devices' IP address, MAC addresses, device name, and/or vendor or manufacturer name is obtained using a router specific API. In yet another embodiment, the other devices' IP address, MAC addresses, device name, and/or vendor or manufacturer name is stored, e.g. in memory 228.

In block 410, determine the status of the SATCOM radio 110. In one embodiment, obtain the IP address of the SATCOM radio 110 from the router 108, e.g. by logging into the router 108 and reading the IP address of the SATCOM radio 110. In another embodiment, determine the presence, operational status, and/or identity (e.g. part number and International Mobile Subscriber Identity (IMSI)) of the SATCOM radio 110, e.g. by issuing one or more queries from the computing device 104 to the SATCOM radio 110 using the simple network management protocol, e.g. SNMPv2, with the IP address of the SATCOM radio 110. If there is no response, then perform a ping test on an IP address of the ground network 120. In a further embodiment, ascertain whether the SATCOM radio 110 is in communications with a satellite 114, e.g. by performing a SNMP query. In yet another embodiment, the presence, operational status, and/or identity of the SATCOM radio 110, are stored, e.g. in the memory 228.

In one embodiment, if the operational status of the SATCOM radio 110 has not been verified, e.g. by a SNMP query or by a ping test, then generate, e.g. with the presentation system 228B, a message indicating that there is no there is no connectivity with the SATCOM radio, and illuminate, e.g. in red, on the computing device 104 a symbol corresponding to the SATCOM radio 110. In another embodiment, if the operational status of the SATCOM radio 110 has not been verified, generate, e.g. with the presentation system 228B, a message stating one or more of: check that the SATCOM radio is powered on, turn off and on the SATCOM radio, and if the condition persists report problem to the crew. In a further embodiment, present a graphical element in the GUI that the user can click on to power off and on the SATCOM radio 110. In yet another embodiment, generate, e.g. with the presentation system 228B, a message stating no Internet connection available.

However, if the SNMP query does not receive a response from the SATCOM radio but one or more pings receive replies, then, in one embodiment, generate, e.g. with the presentation system 228B, a message state one or more of: that SATCOM radio service is not identified, and wireless network SSID, and illuminate, e.g. in gray, in the GUI of the presentation system 228B a symbol corresponding to the SATCOM radio 110. In another embodiment, generate, e.g. with the presentation system 228B, a message stating Internet connection available.

In one embodiment, obtain navigation data from the SATCOM radio 110. In some cases, latitude, longitude, and altitude, speed and heading data is provided. Alternatively, only latitude, longitude and altitude data is provided; and speed and heading data may be determined on the computing device 104. In another embodiment, such navigation data is obtained by accessing the SATCOM radio 110 from the computing device 104 through telenet, logging into the SATCOM radio 110, requesting such navigation data. In a further embodiment, such navigation data is obtained by issuing SNMPv3 queries to the SATCOM radio 110 from the computing device 104 requesting such navigation data. In yet another embodiment, the navigation data is stored, e.g. in the memory 228.

In one embodiment, if the operational status of the SATCOM radio 110 is verified, then in block 412, determine the status of the satellite 114 and satellite ground station 116. In one embodiment, perform an SNMP query of the SATCOM radio 110, using the IP address of the SATCOM radio 110, to determine if the SATCOM radio 110 has formed a communications link with a satellite 114. If a negative, fault, or fail, response is returned, then generate, e.g. with the presentation system 228B, a message indicating that the SATCOM radio has failed, and illuminate, e.g. in red, on the computing device 104 the symbol corresponding to the SATCOM radio 110. In another embodiment, if a negative, or fail, response is returned, generate, e.g. with the presentation system 228B, a message stating one or more of: wait for X minutes for SATCOM radio to recover, turn off and on the SATCOM radio 110, and if the condition persists report problem to the crew. In a further embodiment, present a graphical element in the GUI that the user can click on to power off and on the SATCOM radio 110. In yet another embodiment, generate, e.g. with the presentation system 228B, a message stating no Internet connection available. In yet a further embodiment, a coverage map, for corresponding one or more satellites, may be displayed or is accessible for display.

FIG. 8B illustrates one embodiment of a GUI 850 of a coverage map 852 of network connectivity for the application 228Z. The coverage map 852 illustrates the boundaries 854 of a coverage region of the corresponding network, e.g. of one or more satellites, and the location of the aircraft 856. In another embodiment, a warning of loss of connectivity is issued by the application 228Z, e.g. to the user of the application 228Z and/or to the at least one other devices 111 connected to the network on the aircraft 102, when the aircraft 102 will be leaving a coverage region within a certain period of time, e.g. fifteen minutes, or that the aircraft 102 will be entering a geographical region, e.g. airspace, where connectivity will have to be suspended. In a further embodiment, such an alert may be periodically issued, e.g. until network connection is lost.

FIG. 8C illustrates one embodiment of a GUI 870 of a list of countries 872, e.g. where specific countries are user-selectable. The application 228Z provides a user with the opportunity to select countries to be notified when entering or leaving their airspace. In another embodiment, the application 228Z allows the user to activate and/or deactivate network connectivity when the aircraft 102 enters or leaves the airspace of one or more selected countries.

Returning to FIG. 4, if a not in lock response, or fault and in-network response, are returned, then generate, e.g. with the presentation system 228B, a message indicating that the SATCOM receiver 110 is not logged onto a satellite 114, and illuminate, e.g. in green and red respectively, on the computing device 104 symbols corresponding to the SATCOM radio 110 and the satellite 114. In another embodiment, if a not in lock response is returned, generate, e.g. with the presentation system 228B, a message stating one or more of: check if aircraft is inside hangar or near tall buildings, check if aircraft is inside service coverage area, wait a few minutes for logon process to complete, and if condition persists report problem to the crew. In a further embodiment, generate, e.g. with the presentation system 228B, a message stating no Internet connection available. In yet another embodiment, a coverage map 852, for one or more, may be displayed or be accessible for display.

In one embodiment determine an identifier for the satellite 114. In another embodiment, determine an identifier for the satellite ground station 116. In a further embodiment, determine an identifier for the satellite service, e.g. satellite data service. In yet another embodiment, the status and identifier of the satellite 114 and ground station 116 are stored, e.g. in the memory 228. In yet a further embodiment, the satellite service identifier is stored, e.g. in the memory 228.

In one embodiment, if an in lock or an in network response is returned, then illuminate, e.g. in green, on the computing device 104 symbols corresponding to the SATCOM radio 110, the satellite 114, and ground station 116. In another embodiment, if an in lock or in network response is returned, perform an SNMP query and/or perform a ping test, e.g. of an IP address corresponding to hardware or a website coupled to the ground network 120. Based upon the results of the query and/or ping test determine the level of service available, e.g. data rate and/or percentage or number of lost packets, to the ground network 120.

In one embodiment, in block 414, determine the status of the ground network 120. In another embodiment, if data rate is determined, e.g. Inmarsat Swift 64 v SwiftBroadband, generate, e.g. with the presentation system 228B, a message stating the data rate and/or service, and illuminate, e.g. in green, on the computing device 104 the symbol corresponding to the ground network 120. In a further embodiment, if all packets are lost then generate a message indicating that service is not available, and illuminate, e.g. in red, on the computing device 104 the symbol corresponding to the ground network 120. In yet another embodiment, generate, e.g. with the presentation system 228B, a message stating one or more of: wait X minutes for service to connect and reset SATCOM radio channel. In a yet a further embodiment, generate, e.g. with the presentation system 228B, a message stating no Internet connection available. In one embodiment, a coverage map 852, for corresponding one or more satellites, may be displayed or be accessible for display.

FIG. 9 illustrates one embodiment of graphical user interface 900 of a network status page indicating that there is no Internet connection available due to a ground station 120. The network status GUI 900 presents icons 902 associated with each communications component and communications link of the sequence of communications components and communications links that provides network connectivity to the computing device 104 on which the application 228Z resides. Each link in the end-to-end communications path is represented by an icon. One embodiment of the illustrated icons will now be described: If the status of a communications component or communications link is unknown, its color will be grey. Specific icons will now be described.

Wi-Fi Performance Icon 902A: If Wi-Fi of the computing device 104 is on, the first icon 902A will be green. If Wi-Fi is off or not functioning, this icon will be red.

Wireless Access Point Icon 902B: If a computing device 104 is connected to a wireless access point 106, this icon will be green. If the computing device 104 is not connected to a wireless access point 106, this icon will be red.

Router Icon 902C: If a router 108 is operational, this icon will be green. If the router 108 is not operational, this icon will be red.

SATCOM Radio Icon 902D: If a SATCOM radio 110 is operational, this icon will be green. If the SATCOM radio 110 is not operational, this icon will be red.

Satellite Icon 902E: If the SATCOM radio 110 reports that it is logged onto a satellite, this icon will be green. If the SATCOM radio 110 reports that it is not logged onto the satellite, this icon will be red.

Satellite Ground Station Icon 902F: If the SATCOM radio 110 reports that it is logged onto a satellite, this icon will be green. If the SATCOM radio 110 reports that it is not logged onto the satellite, this icon will be red.

Ground Network Icon 902G: If the computing device 104 is able to ping and receive a reply from an IP address in a ground network 120, this icon will be green. If the computing device 104 receives no ping replies from the ground network 120, this icon will be red.

The network status GUI 900 also presents navigation data 906 associated with the aircraft 102. When a user selects the "view details" graphical element 904, the presentation system 228B presents the user with the GUI 1000 of the details page for which one embodiment is illustrated in FIG. 10. The details GUI 1000 that presents potential solutions for the lack of network connectivity, including instructions 1002 to wait for a period of time for the broadband service to connect, graphical element 1004 which can be clicked to reset a channel of SATCOM radio 110, and instructions 1006 to report the connectivity problem to a flight crew if the lack of connectivity persists.

Returning to FIG. 4, in one embodiment, if 3-4 out of 5 packets are lost then generate, e.g. with the presentation system 228B, a message stating one or more of: service performance may be reduced, "Wireless Network" and corresponding SSID, and "Satellite in Use" and satellite identifier, and illuminate, e.g. in amber, on the computing device 104 the symbol corresponding to the ground network 120. In another embodiment, generate, e.g. with the presentation system 228B, a message stating one or more of: wait X minutes for service to connect and reset SATCOM radio channel. In a further embodiment, present a graphical element in the GUI that the user can click on to power off and on the SATCOM radio 110. In yet another embodiment, generate, e.g. with the presentation system 228B, a message stating Internet connection available. In yet a further embodiment, a coverage map 852, for corresponding to one or more satellites, may be displayed or be accessible for display.

In one embodiment, if 0-2 out of 5 packets are lost then generate, e.g. with the presentation system 2228B, a message stating one or more of: "Service", "Wireless Network" and corresponding SSID, and "Satellite in Use" and satellite identifier, and illuminate, e.g. in green, on the computing device 104 the symbol corresponding to the ground network 120. In another embodiment, generate, e.g. with the presentation system 228B, a message stating Internet connection available. In a further embodiment, the status of the ground service is stored, e.g. in the memory 228. In yet another embodiment, a coverage map 852, for one or more satellites, may be displayed or be accessible for display.

In one embodiment, in block 416, the application 228Z permits control of which each of the at least one other computing device 111 can connect to the network, e.g. by controlling the media access control function on the router 108. In another embodiment, through the application 228Z, other devices can be identified and excluded from the network, e.g. because of a concern of malicious activity. In a further embodiment, only those at least one other computing device 111 that are to be connected to the network can be specifically identified, e.g. to provide greater bandwidth to such user(s) such as corporate executives, to provide exclusive access to the network. In yet another embodiment, such media access control functionality of the router 108 may be manipulated by logging into the HTML page of the router 108, and selecting and entering the corresponding function and media address control addresses.

Figure 11:
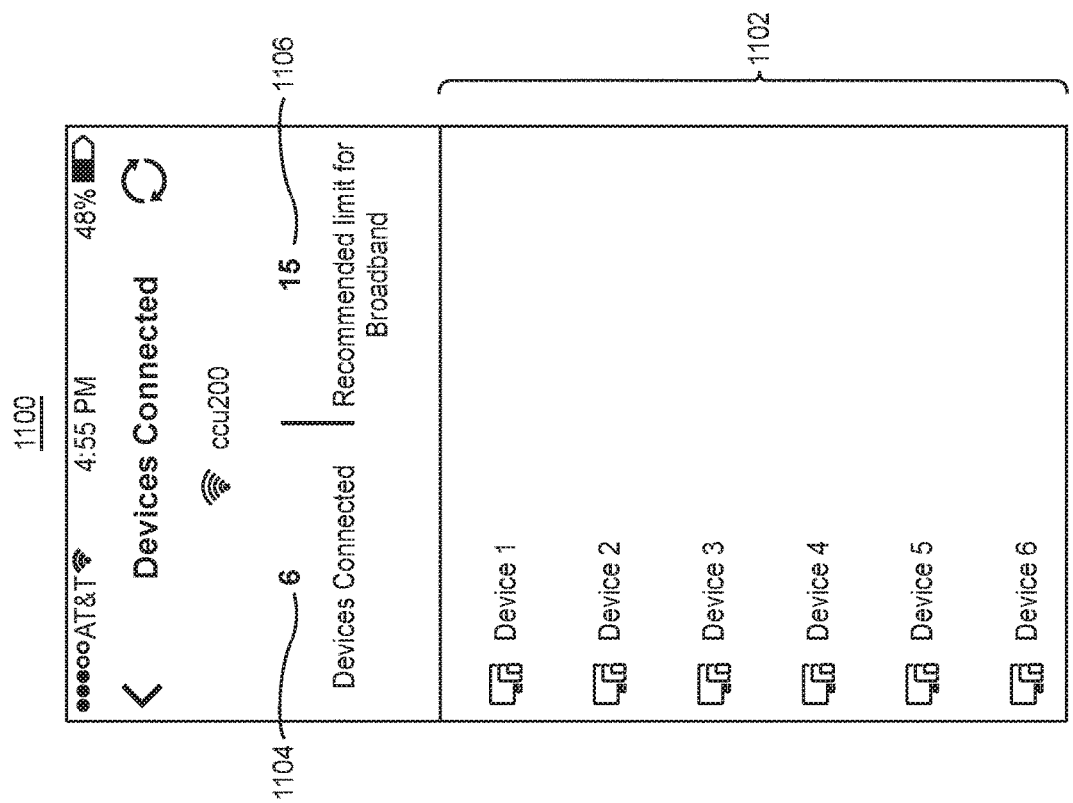
FIG. 11 illustrates one embodiment of a graphical user interface of a list of other computing devices connected to a network.

FIG. 11 illustrates one embodiment of a graphical user interface 1100 of a list 1102 of the at least one other computing device 111 connected, e.g. to the router 108 of the current wireless network to which the computing device 104 on which the application 228Z resides is connected. In another embodiment, the application 228Z permits the user to select one or more of the at least one other computing device 111 to be excluded from the network, or to select specific one or more of the at least one other computing device 111 to be connected to the network. In a further embodiment, the application 228Z, through the GUI 1100, identifies the number of users connected to the network 1104, and the recommended maximum number of users 1106 that should be connected to the communications network based upon the networks bandwidth. In yet another embodiment, the application 228Z issues a message if the number of connected users exceeds the recommended number of users. In yet a further embodiment, the application 228Z does not allow additional users to join the network if the number of users has reached the limit. In one embodiment, the application 228Z displays the data consumption of each of the other at least one computing device 111 connected, e.g. to the router 108 of the current wireless network to which the computing device 104 on which the application 228Z resides is connected Returning to FIG. 4, in one embodiment, in block 418, if the service associated with satellite 114, satellite ground station 116, and/or ground network 120 are not deemed suitable, e.g. providing the necessary bandwidth or data rates, the application 228Z permits the user to select another communications network, e.g. another satellite communications network using another SATCOM radio. In another embodiment, particularly if the cost of the other communications network is high, the application permits the user to enter a time of use and/or data cap for the other communications network. Upon reaching one of the caps, the application 228Z disconnects the SATCOM radio 110 from the other satellite, thus terminating the other communications network. In a further embodiment, the application 228Z alerts and/or will issue alerts to the at least one other computing device 111 connected to the network that the network connectivity will be disconnected.

In one embodiment, in block 420, after a period of time, or upon user or another systems request, return to block 404 and repeat blocks 404 through 418. In another embodiment, the period of time for such a refresh can be entered by a user or another system, e.g. with the presentation system 228B.

Figure 12:
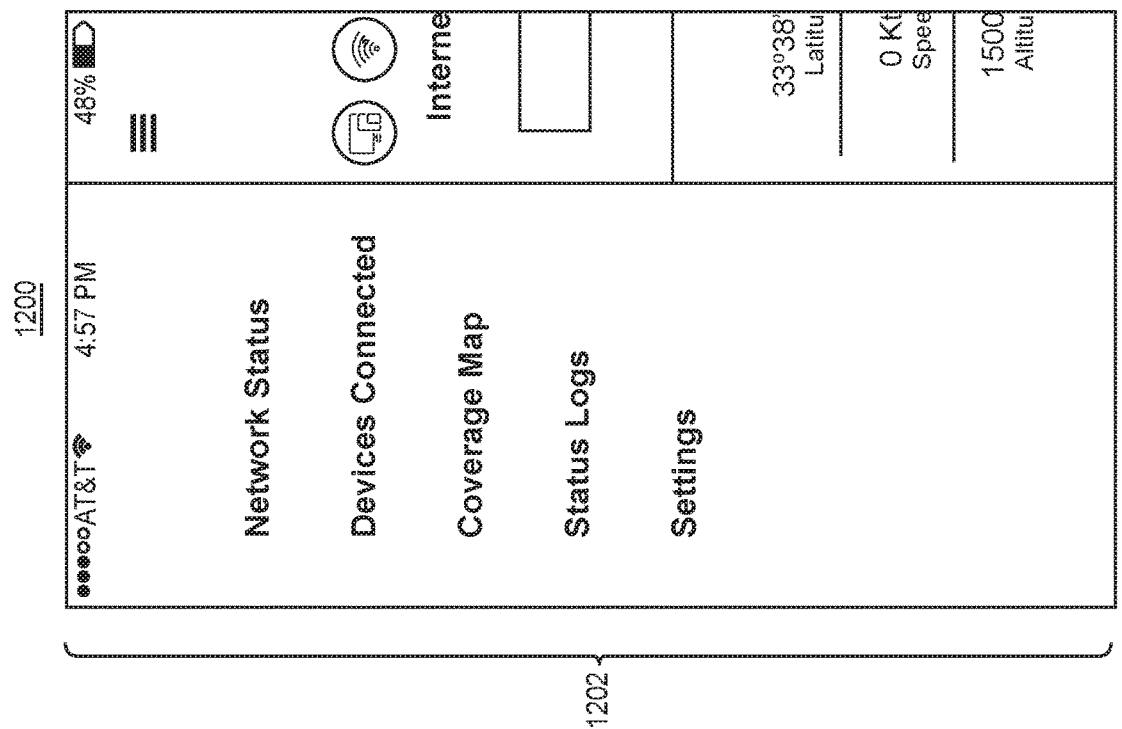
FIG. 12 illustrates one embodiment of a graphical user interface that includes a drop-down menu.

FIG. 12 illustrates one embodiment of a GUI 1200, e.g. generated by the presentation system 228B, that includes a drop-down menu 1202, which provides selections for a user and, when selected, presents data associated with each of the provided user selections of the drop-down menu 1202. The drop-down menu 1202 includes options for a user to select and view a network status, the devices connected to the network, a coverage map 852 for the network connectivity, status logs associated with executing the process to test each communications component and communications links in the connectivity sequence, and settings for the application.

Figure 13:
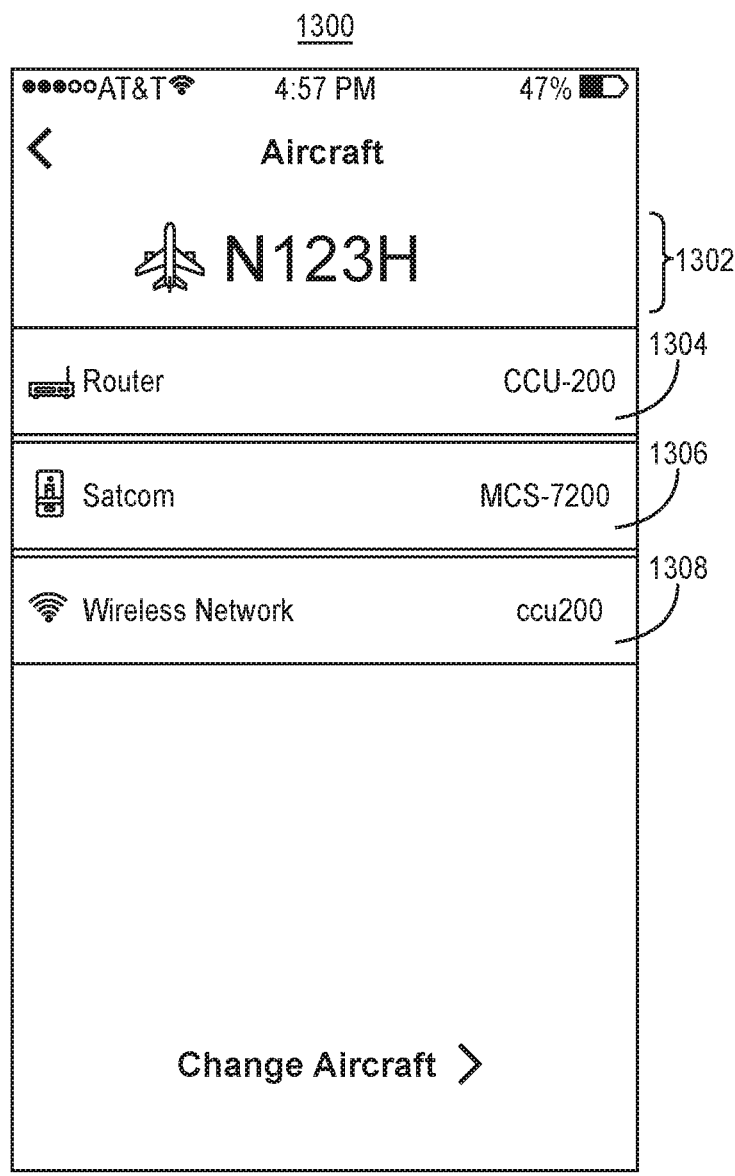
FIG. 13 illustrates one embodiment of a graphical user interface of a details page that provides information about a communications network onboard an aircraft.

FIG. 13 illustrates one embodiment of a GUI 1300 of a details page that provides information about a communications network onboard an aircraft. In another embodiment, the GUI 1300 is presented by the application 228Z when a user clicks on the airplane icon 708 shown in FIG. 7. In a further embodiment, the particular aircraft is identified by the tail number 1302, and the communications network is shown to include a particular router 1304, a particular SATCOM radio 1306, and a particular wireless network 1308 provided by an onboard wireless transmitter.

In one embodiment, the application includes status logs. Each status log is associated with a particular aircraft. The status logs are identified by the aircraft tail numbers, and provide connectivity data during which the computing device is operating onboard each aircraft.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communications path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like.

The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "systems" in order to more particularly emphasize their implementation independence. For example, functionality referred to herein as a system may be implemented wholly, or partially, as a hardware circuit comprising custom VLSI circuits or gate arrays, off-the-shelf semiconductors such as logic chips, transistors, or other discrete components. A system may also be implemented in programmable hardware devices such as field programmable gate arrays, programmable array logic, programmable logic devices, or the like. Systems may also be implemented in software for execution by various types of processors. An identified system of executable code may, for instance, comprise one or more physical or logical systems of computer instructions that may, for instance, be organized as an object, procedure, or function. Nevertheless, the executables of an identified system need not be physically located together, but may comprise disparate instructions stored in different locations that, when joined logically together, comprise the system and achieve the stated purpose of the system. A system of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

EXAMPLE EMBODIMENTS

Example 1 includes a method for presenting network connectivity data, the method comprising: testing a plurality of communications components and communications links of a network, wherein each of the plurality of components and communications links is communicatively coupled to a computing device, where the plurality of communications components and communications links is configured to provide the computing device access to a ground network; determining operational capability of each of the plurality of components and communications links; and presenting an indication of the operational capability for each of the plurality of components and communications links based upon results of the testing.

Example 2 includes the method of Example 1, wherein presenting the indication of the operational capability for each of the plurality of components and communications links based upon results of the testing further comprises providing at least one of a visual representation and textual description of a connectivity status of each of the plurality of components and communications links.

Example 3 includes the method of any of Examples 1-2, wherein testing the plurality of communications components and communications links of the network comprises testing a plurality of communications components and a communications links in and coupled to a vehicle.

Example 4 includes the method of Example 1-3, further comprising receiving an identifier of the vehicle; and identifying the plurality of communications components and communications links in and coupled to, and the type of communications services available to, the vehicle.

Example 5 includes the method of any of Examples 1-4, further comprising: monitoring a location of the vehicle; and providing at least one notification when network connectivity is affected by at least one of vehicle movement and vehicle location.

Example 6 includes the method of any of Examples 1-5, further comprising displaying at least one of (a) at least one recommended corrective action how to resolve a network connectivity issue, and (b) a recovery mechanism to resolve the network connectivity issue.

Example 7 includes the method of any of Examples 1-6, further comprising controlling access to the network by at least one of: blocking access to at least one specific computing device and granting access to at least one specific computing device.

Example 8 includes a program product comprising a non-transitory processor-readable medium on which program instructions are embodied, wherein the program instructions are operable to: test a plurality of communications components and communications links of a network, wherein each of the plurality of components and communications links is communicatively coupled to a computing device, and wherein the plurality of communications components and communications links is configured to provide the computing device access to a ground network; determine operational capability of each of the plurality of components and communications links; and present an indication of the operational capability for each of the plurality of components and communications links based upon results of the testing.

Example 9 includes the program product of Example 8, wherein the program instructions operable to present the indication of the operational capability for each of the plurality of components and communications links based upon results of the testing further comprise program instructions operable to provide at least one of a visual representation and textual description of a connectivity status of each of the plurality of components and communications links.

Example 10 includes the program product of any of Examples 8-9, wherein the program instructions are operable to test the plurality of communications components and communications links of the network further comprise testing a plurality of communications components and communications links in and coupled to a vehicle.

Example 11 includes the program product of Example 8-10, wherein the program instructions are further operable to: receive an identifier of the vehicle; and identify the plurality of communications components and communications links in and coupled to, and the type of communications services available to, the vehicle.

Example 12 includes the program product of Example 8-11, wherein the program instructions are further operable to: monitor a location of the vehicle; and provide at least one notification when network connectivity is affected by at least one of vehicle movement and vehicle location.

Example 13 includes the program product of any of Examples 8-12, wherein the program instructions are further operable to display at least one of (a) at least one recommended corrective action how to resolve a network connectivity issue, and (b) a recovery mechanism to resolve the network connectivity issue.

Example 14 includes the program product of any of Examples 8-13, wherein the program instructions are further operable to control access to the network by at least one of: blocking access to at least one specific computing device and granting access to at least one specific computing device.

Example 15 includes a computing device, comprising: a processing system comprising a memory coupled to a processor; at least one input/output device coupled to the processing system; communications circuitry coupled to the processing system; and wherein the memory comprises an application comprising program instructions configured to be executed by the processor to: test a plurality of communications components and communications links of a network, wherein each of the plurality of components and communications links is communicatively coupled to a computing device, and wherein the plurality of communications components and communications links is configured to provide the computing device access to a ground network; determine operational capability of each of the plurality of components and communications links; and present an indication of the operational capability for each of the plurality of components and communications links based upon results of the testing.

Example 16 includes the computing device of Example 15, wherein the program instructions are further operable to test the plurality of communications components and communications links of the network comprises testing a plurality of communications components and a communications links in and coupled to a vehicle.

Example 17 includes the computing device of any of Examples 15-16, wherein the program instructions are further operable to: receive an identifier of the vehicle; and identify the plurality of communications components and communications links in and coupled to, and the type of communications services available to, the vehicle.

Example 18 includes the computing device of Example 15-17, wherein the program instructions are further operable to: monitor a location of the vehicle; and provide at least one notification when network connectivity is affected by at least one of vehicle movement and vehicle location.

Example 19 includes the computing device of Example 15-18, wherein the program instructions are further operable to display at least one of (a) at least one recommended corrective action how to resolve a network connectivity issue, and (b) a recovery mechanism to resolve the network connectivity issue.

Example 20 includes the computing device of Example 15-19, wherein the program instructions are further operable to control access to the network by at least one of: blocking access to at least one specific computing device and granting access to at least one specific computing device.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for presenting network connectivity data on a vehicle, the method comprising:
receiving, by a processor executing an application on a mobile computing device, an identifier of the vehicle, the identifier of the vehicle including unique vehicle registration information of the vehicle;
identifying, by the processor via the application, a plurality of communications components and communications links of a network in and coupled to, and the type of communications services available to, the vehicle based on the identifier of the vehicle, wherein the network includes at least one or more of a first network and a second network, wherein the plurality of communications components of the first network includes at least a router, a SATCOM radio, one or more satellites, and a satellite ground station, wherein the plurality of communications components of the second network includes at least a router, a cellular radio, and a cellular ground station, wherein each of the plurality of communications components and communications links is communicatively coupled to the mobile computing device, wherein the plurality of communications components and communications links are configured to provide the mobile computing device access to a ground network;
testing, by the processor via the application, each of the plurality of communications components and communications links of the network;
determining, by the processor via the application, operational capability of each of the plurality of communications components and communications links based upon results of the testing;
presenting, by the processor via the application, an indication of the operational capability for each of the plurality of communications components and communications links on a display of the mobile computing device; and
controlling, by the processor via the application, one or more of the plurality of communications components and communications links of the network to resolve a network connectivity issue based on the results of the testing, by resetting or changing a channel of one or more of the plurality of communications components and communications links of the network.

2. The method of claim 1, wherein presenting, by the processor via the application, the indication of the operational capability for each of the plurality of communications components and communications links based upon results of the testing further comprises providing, by the processor via the application, at least one of a visual representation or textual description of a connectivity status of each of the plurality of communications components and communications links.

3. The method of claim 1, further comprising:
monitoring, by the processor via the application, a location of the vehicle; and providing, by the processor via the application, at least one notification when network connectivity is affected by at least one of vehicle movement and vehicle location.

4. The method of claim 1, further comprising displaying, by the processor via the application, at least one of (a) at least one recommended corrective action how to resolve a network connectivity issue, or (b) a recovery mechanism to resolve the network connectivity issue on the mobile computing device.

5. The method of claim 1, further comprising controlling, by the processor via the application, access to the network by at least one of: blocking, by the processor via the application, access to at least one specific computing device or granting, by the processor via the application, access to at least one specific computing device.

6. The method of claim 1, wherein controlling, by the processor via the application, one or more of the plurality of communications components and communications links of the network to resolve a network connectivity issue based on the results of the testing further includes:
   initiating, by the processor via the application, a ping test to the one or more of the plurality of communications components and communications links.

7. A program product comprising a non-transitory processor-readable medium on which program instructions are embodied, wherein the program instructions are operable to:
   receive, by a processor executing an application on a mobile computing device, an identifier of the vehicle, the identifier of the vehicle including unique vehicle registration information of the vehicle;
   identify, by the processor via the application, the plurality of communications components and communications links of a network in, and coupled to, and the type of communications services available to, the vehicle based on the identifier of the vehicle, wherein the network includes at least one or more of a first network and a second network, wherein the plurality of communications components of the first network includes at least a router, a SATCOM radio, one or more satellites, and a satellite ground station, wherein the plurality of communications components of the second network includes at least a router, a cellular radio and a cellular ground station, and wherein each of the plurality of components and communications links is communicatively coupled to the mobile computing device, and wherein the plurality of communications components and communications links is configured to provide the mobile computing device access to a ground network;
   test, by the processor via the application, each of the plurality of communications components and communications links of the network;
   determine, by the processor via the application, operational capability of each of the plurality of components and communications links;
   present, by the processor via the application, an indication of the operational capability for each of the plurality of components and communications links based upon results of the testing; and
   control, by the processor via the application, one or more of the plurality of communications components and communications links of the network to resolve a network connectivity issue based on the results of the testing, by resetting or changing a channel of one or more of the plurality of communications components and communications links of the network.

8. The program product of claim 7, wherein the program instructions operable to present, by the processor via the application, the indication of the operational capability for each of the plurality of communications components and communications links based upon results of the testing further comprise program instructions operable to provide, by the processor via the application, at least one of a visual representation or textual description of a connectivity status of each of the plurality of communications components and communications links.

9. The program product of claim 7, wherein the program instructions are further operable to:
   monitor, by the processor via the application, a location of the vehicle; and
   provide, by the processor via the application, at least one notification when network connectivity is affected by at least one of vehicle movement and vehicle location.

10. The program product of claim 7, wherein the program instructions are further operable to display, by the processor via the application, at least one of (a) at least one recommended corrective action how to resolve a network connectivity issue, or (b) a recovery mechanism to resolve the network connectivity issue on the mobile computing device.

11. The program product of claim 7, wherein the program instructions are further operable to control, by the processor via the application, access to the network by at least one of: blocking, by the processor via the application, access to at least one specific computing device or granting, by the processor via the application, access to at least one specific computing device.

12. The program product of claim 7, wherein the program instructions operable to control, by the processor via the application, one or more of the plurality of communications components and communications links of the network to resolve a network connectivity issue based on the results of the testing further include
   initiate, by the processor via the application, a ping test to the one or more of the plurality of communications components and communications links.

13. A mobile computing device, comprising:
   a processing system comprising a memory coupled to a processor;
   at least one input/output device coupled to the processing system;
   communications circuitry coupled to the processing system; and
   wherein the memory comprises an application comprising program instructions configured to be executed by the processor to:
   receive, by a processor executing an application on a mobile computing device, an identifier of the vehicle, the identifier of the vehicle including unique vehicle registration information of the vehicle;
   identify, by the processor via the application, the plurality of communications components and communications links of a network in, and coupled to, and the type of communications services available to, the vehicle based on the identifier of the vehicle, wherein the network includes at least one or more of a first network and a second network, wherein the plurality of communications components of the first network includes at least a router, a SATCOM radio, one or more satellites, and a satellite ground station, wherein the plurality of communications components of the second network includes at least a router, a cellular radio and a cellular ground station, and wherein each of the plurality of components and communications links is communicatively coupled to the mobile computing device, and wherein the plurality of communications components and communications links is configured to provide the mobile computing device access to a ground network;

test, by the processor via the application, each of the plurality of communications components and communications links of the network;

determine, by the processor via the application, operational capability of each of the plurality of components and communications links;

present, by the processor via the application, an indication of the operational capability for each of the plurality of components and communications links based upon results of the testing; and control, by the processor via the application, one or more of the plurality of communications components and communications links of the network to resolve a network connectivity issue based on the results of the testing, by resetting or changing a channel of one or more of the plurality of communications components and communications links of the network.

14. The mobile computing device of claim of claim 13, wherein the program instructions are further operable to:

monitor, by the processor via the application, a location of the vehicle; and provide, by the processor via the application, at least one notification when network connectivity is affected by at least one of vehicle movement and vehicle location.

15. The mobile computing device of claim 13, wherein the program instructions are further operable to display, by the processor via the application, at least one of (a) at least one recommended corrective action how to resolve a network connectivity issue, or (b) a recovery mechanism to resolve the network connectivity issue on the mobile computing device.

16. The mobile computing device of claim 13, wherein the program instructions are further operable to control, by the processor via the application, access to the network by at least one of: blocking, by the processor via the application, access to at least one specific computing device or granting, by the processor via the application, access to at least one specific computing device.

17. The mobile computing device of claim 13, wherein the program instructions operable to control, by the processor via the application, one or more of the plurality of communications components and communications links of the network to resolve a network connectivity issue based on the results of the testing further include:

initiate, by the processor via the application, a ping test to the one or more of the plurality of communications components and communications links.

\* \* \* \* \*